W. I. HARP.
DEMOUNTABLE RIM.
APPLICATION FILED MAY 24, 1922.

1,436,249.

Patented Nov. 21, 1922.
2 SHEETS—SHEET 1.

Inventor
William I. Harp.
By
Thomas R. Harney
Attorney

W. I. HARP.
DEMOUNTABLE RIM.
APPLICATION FILED MAY 24, 1922.
1,436,249.
Patented Nov. 21, 1922.
2 SHEETS—SHEET 2.
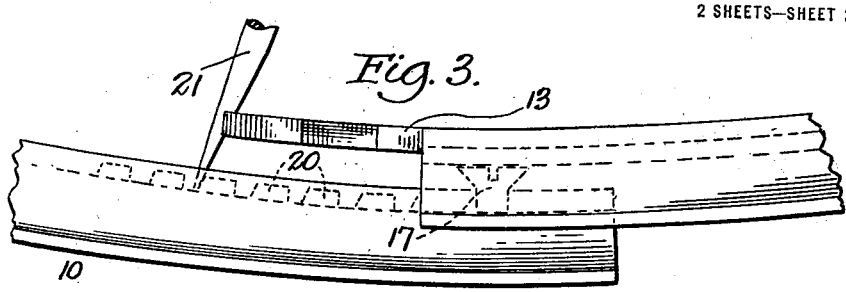
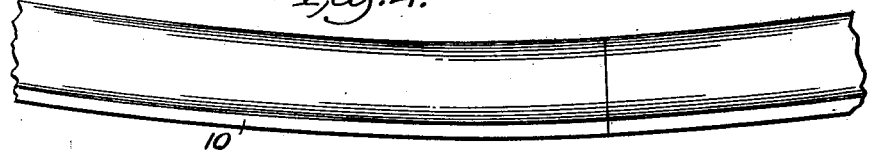
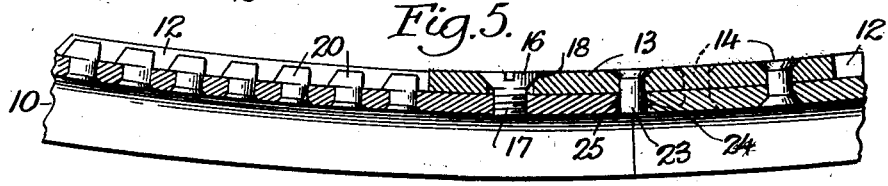
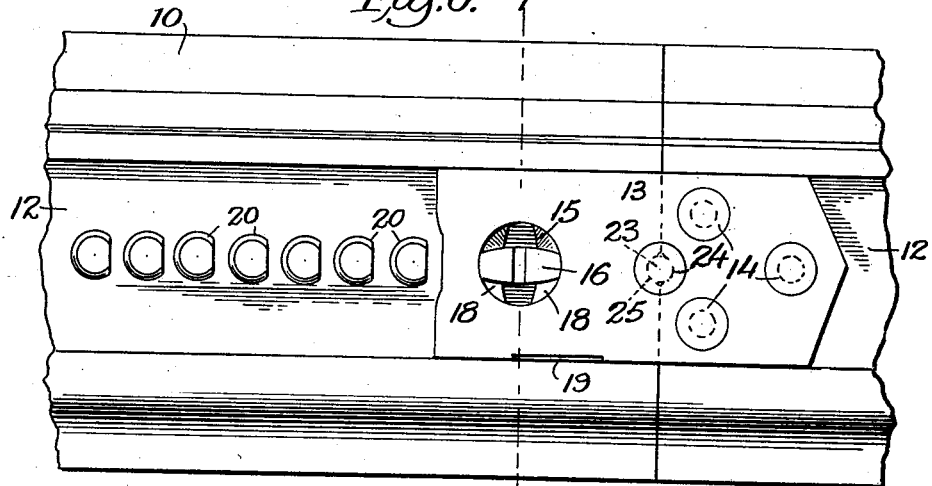
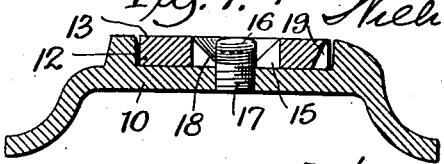

Patented Nov. 21, 1922.

1,436,249

UNITED STATES PATENT OFFICE.

WILLIAM I. HARP, OF GALAX, VIRGINIA.

DEMOUNTABLE RIM.

Application filed May 24, 1922. Serial No. 563,355.

*To all whom it may concern:*

Be it known that I, WILLIAM I. HARP, a citizen of the United States of America, residing at Galax, in the county of Grayson and State of Virginia, have invented certain new and useful Improvements in Demountable Rims, of which the following is a specification.

My present invention relates generally to demountable rims, and more particularly to rims of this type providing for quick and easy detachment of a tire therefrom, my object being the provision of a rim in one-piece, having maximum strength, durability and rigidity, and in connection with which detachment of a tire may be accomplished without the necessity of special rim reducing and expanding devices and likewise without requiring the use of hammers or other implements use of which quickly mars and destroys both its appearance and general effectiveness.

Figure 1:
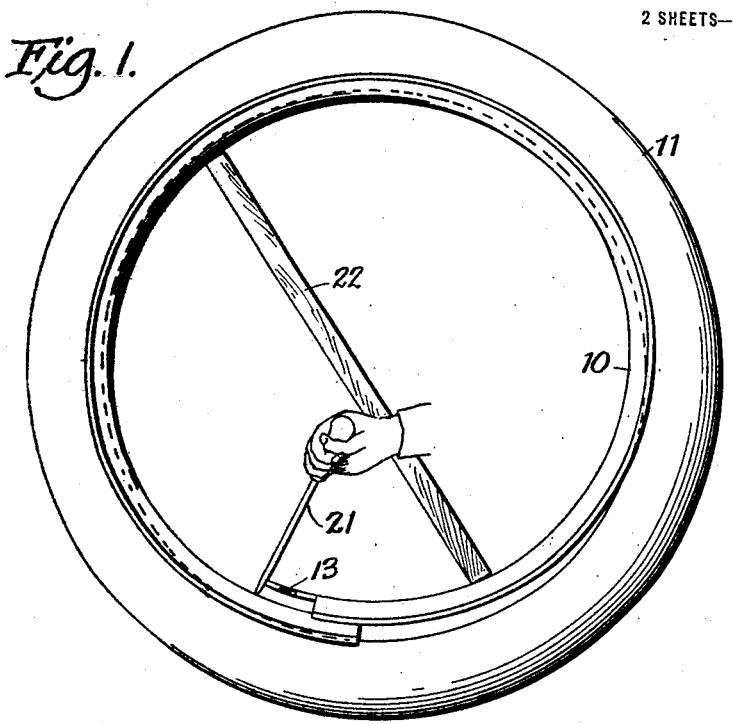
Figure 2:
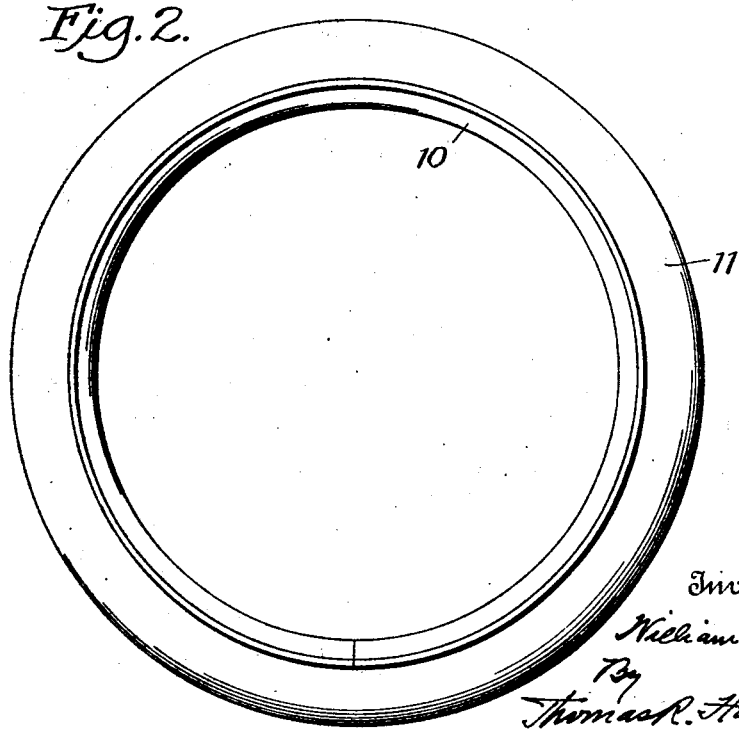

With these general objects in mind my invention resides in a demountable rim constructed in a manner which I will now describe with respect to the accompanying drawings, which form a part of this specification, and wherein, Figure 1 is a side view showing the rim reduced and in inactive position for detachment of a tire therefrom or the mounting of a tire thereon, Figure 2 is a similar view showing the rim expanded with the ends in the endwise abutting active position, Figure 3 is an enlarged side view of a portion of the rim adjacent to its ends with the latter overlapped as in Figure 1, Figure 4 is an enlarged side view of a portion of the rim showing the ends in their normal endwise abutting relation when the rim is expanded, Figure 5 is a central longitudinal section taken through the parts shown in Figure 4, Figure 6 is a top plan view of the parts shown in Figure 5, and Figure 7 is a cross section through parts taken on line 7—7 of Figure 6.

Referring now to these figures the rim 10 as proposed by my invention may be of the usual externally channeled form and is fashioned to receive any type of straight side tire 11 and otherwise formed as will be presently seen so that it may be disposed upon any suitable type of wheel. According to my invention the rim 10 is formed in a single piece with endwise abutting ends and is tensioned so that these ends spring into overlapping relation in the position shown in Figures 1 and 3 when they are displaced from the endwise abutting position shown in Figures 2 and 4.

In order to secure the rim in the effective position of Figures 2, 4 and 5, its inner surface which is circumferentially channeled as at 12, has a connecting plate 13, securely fastened as by means of rivets 14 to one of the ends so as to project beyond the latter and overlap the opposing end. The free extending portion of this connecting plate 13, the latter of which by virtue of its extension within the inner channel 12 thus avoids interference with the placing of the rim upon a wheel felly and locks the rim ends against lateral displacement, has a transversely elongated slot 15 adapted to receive therethrough the flattened head 16 of a connecting bolt 17 the latter of which is rotatably mounted in one of the rim ends so that its head 16 may be turned from a transverse position adapting it for passage through the slot 15, to a lengthwise position in which it is locked with the connecting plate 13, the latter having in its inner face at the sides of the slot 15 recesses 18 whereby the head 16 is countersunk in the connecting plate at all times it is engaged therewith.

This connecting plate is preferably slightly cut away at one side and beveled as at 19 for the introduction of a screw driver or similar tool whereby after the locking bolt 17 has been turned to a transverse position, the connecting plate 13 may be pried upwardly over the bolt, thus lifting one end of the rim so that the normal tension of the rim may exert itself toward a reduced circumference and the overlapping inactive position of Figures 1 and 3 in order to permit the tire 11 to be readily removed.

After a new tire has been placed on the reduced rim, or the same tire replaced after repair, the rim may be levered in step by step movements back to the active position with its ends in the abutting relation shown in Figures 4, 5 and 6 by virtue of a plurality of studs or rivets 20 secured in a longitudinal series along the median line of the rim adjacent to and inwardly beyond the locking bolt 17, these studs or rivets having their heads within and centrally of the inner groove 12 of the rim so that a screw driver or like implement as at 21 in Figures 1 and 3 may be utilized as a lever, the successive bolts or rivets 20 forming a series of fulcrum points for one end of the screw driver the latter of which in use bears against the free end of the connecting plate 13 in the manner shown.

In thus levering the rim into normal endwise abutting relation, a rod, stick or other brace 22 as seen in Figure 1 may be utilized to hold the rim in its step by step adjusted positions while each new fulcrum point is sought.

It is to be further noted from Figures 5 and 6 in particular that I propose to provide the connecting plate 13 with a centrally disposed outstanding stud 23 extending at all times partially into a semicircular recess 24 located centrally of the rim end to which said connecting plate is riveted or otherwise securely fastened. This stud is also adapted to extend into a similar recess 25 centrally of the other rim end when the two rim ends are in the abutting effective position as shown in Figure 5, so as to thus cooperate with the connecting plate itself within the inner groove of the rim and assist in preventing all danger of accidental lateral displacement of the rim ends.

It is obvious from the foregoing therefore that my invention presents a rim capable of demountable disposition upon any suitable wheel felly including the various types now in use and that the rim may be readily manipulated without the use of special tools and implements and by means of anything in the nature of a screw driver ordinarily carried as a necessary part of the equipment of automobiles.

It is further obvious that I provide a rim which will be rigid and strong by virtue of a minimum number of movable parts, as well as one which may be securely locked and easily released.

I claim:

1. A demountable rim having normally abutting ends and tensioned to spring its ends into overlapping relation when the latter are displaced, said rim having an inner circumferential groove, a connecting plate disposed in said groove and adapted to overlap the joint between said ends when the latter are in abutting relation, said connecting plate being rigidly secured to one of the rim ends and having a transversely disposed slot and beveled recesses in its inner surface at the sides of said slot, a rotatable bolt in the other end of the rim having a beveled head to interfit the said slot and adapted to seat in the said recesses when turned at right angles to the slot, and a lengthwise series of studs secured in the last mentioned end of the rim inwardly beyond the said bolt and having their heads disposed in the rim groove to form successive fulcrum points for a lever utilized against the free end of the said connecting plate as described.

2. A demountable rim having normally abutting ends and having an inner circumferential groove, a connecting plate disposed in said groove and adapted to overlap the joint between the rim ends in their abutting relation, said plate being rigidly secured to one of the rim ends and having an outwardly projecting stud intermediate its ends partially seated in a recess of the rim end to which it is secured, and a locking member carried by the other rim end to detachably engage the said connecting plate when the rim ends abut, said last mentioned rim end having a recess into which the said stud is also partially engageable for the purpose described.

In testimony whereof I have affixed my signature.

WILLIAM I. HARP.